United States Patent
Rande et al.

(10) Patent No.: US 9,391,788 B2
(45) Date of Patent: Jul. 12, 2016

(54) METHOD AND DEVICES TO INVITE A USER FROM AN EXTERNAL CHAT SERVICE TO A GROUP CHAT SESSION

(71) Applicant: Infinite Convergence Solutions, Inc, Arlington Heights, IL (US)

(72) Inventors: Kristian V. Rande, Palatine (IL); Talila E. Millman, Highland Park, IL (US); Ramesh Natarajan, Buffalo Grove, IL (US)

(73) Assignee: Infinite Convergence Solutions, Inc, Arlington Heights, IL (US)

( * ) Notice: Subject to any disclaimer, the term of this patent is extended or adjusted under 35 U.S.C. 154(b) by 13 days.

(21) Appl. No.: 14/254,687

(22) Filed: Apr. 16, 2014

(65) Prior Publication Data

US 2014/0317205 A1    Oct. 23, 2014

Related U.S. Application Data

(60) Provisional application No. 61/813,556, filed on Apr. 18, 2013.

(51) Int. Cl.
*G06F 15/16* (2006.01)
*H04L 12/18* (2006.01)

(52) U.S. Cl.
CPC ................................. *H04L 12/1822* (2013.01)

(58) Field of Classification Search
USPC .......................... 709/201, 206, 202, 203, 204
See application file for complete search history.

(56) References Cited

U.S. PATENT DOCUMENTS

2006/0089998 A1* 4/2006 Kim .................. H04L 29/06027
709/229
2007/0038758 A1* 2/2007 Mu ..................... H04L 12/1818
709/227
2007/0168490 A1* 7/2007 Kent ................. G06F 17/30887
709/223

* cited by examiner

*Primary Examiner* — Lan-Dai T Truong
(74) *Attorney, Agent, or Firm* — Russell E. Sorber

(57) ABSTRACT

This is a method and devices used to invite a user from one message chat service into a preexisting group chat session located on another chat service.

1 Claim, 3 Drawing Sheets

METHOD AND DEVICES TO INVITE A USER FROM AN EXTERNAL CHAT SERVICE TO A GROUP CHAT SESSION

CROSS-REFERENCE TO RELATED APPLICATIONS

This application claims the benefit of U.S. Provisional Application No. 61/813,556 filed on Apr. 18, 2013 by the present inventors which is incorporated by reference into this application.

FEDERALLY SPONSORED RESEARCH

None.

SEQUENCE LISTING

None.

FIELD OF THE INVENTION

This relates to a method and devices which invite a user from one message chat service into a preexisting group chat on another service.

BACKGROUND OF THE INVENTION

With the growing adoption of Internet-capable smartphones, wireless carriers face competition from Over-the-Top (OTT) messaging providers such as Facebook™ Messenger, WhatsApp™, Kik™, Tango™, Viber™ and others. These OTT providers typically operate closed chat systems designed in such a way that OTT users and RCS messaging users on wireless carriers cannot form mixed group chat sessions. This is a method by which carriers on one chat system, such as wireless carriers using Rich Communication Suite, can invite and enable OTT messaging users to join an operator based Rich Communication Suite (RCS) based instant messaging session. Notably this method only requires that one member of an ongoing Rich Communication Suite (RCS) group chat session be a member of the OTT messaging service in order for all members of the RCS group to exchanges messages with the OTT message service. Conventional solutions have proposed to set-up a server-to-server cooperation (chat federation) between OTT messaging systems and RCS-based messaging systems or use of a gateway. These proposals work for scenarios where every RCS user has an account in both messaging system, but they create a poor user experience for group chat sessions involving users who have an account in only one of the messaging systems. What is needed is a method to easily invite members of an OTT message service into an ongoing RCS chat without every member of the RCS chat needing credentials in the OTT messaging system.

SUMMARY OF INVENTION

This is a new way for users of one chat service to invite users of another chat service into a group chat session. In the preferred embodiment, RCS (a.k.a Joyn®) clients in a group chat invite one or more users of over-the-top (OTT) instant messaging systems to participate in RCS-based instant messaging sessions controlled by a wireless carrier. In the preferred embodiment a network API, which may include but is not limited to an XMPP based API, is used to invite users on that external chat system to join a chat conversation on a separate, local chat system. The invitation partially or wholly consists of a Unifrom Resource Identifier (URI) and is transmitted over a messaging connection established through the network API provided by the external chat system.

This URI may be transmitted from either a client or the server associated with the first chat system. In the preferred embodiment this URI is accompanied by a text message invitation originating from a user in the first chat system.

When the user on the external chat system receives the URI and clicks on the hyperlink associated with the URI, the user device launches a web browser and loads a web-based "thin client." The thin client then uses asynchronous HTTP requests to participate in the chat conversation in the local chat system in the particular group session which is associated with that URI.

A mobile client on a wireless carrier (such as Verizon Wireless) could use this to invite users on an OTT chat system (such as Facebook® Messenger) to join an RCS chat session previously established in that wireless carrier's network.

Advantages of this approach include:
- An RCS messaging user may invite a user on a closed OTT messaging system to join an RCS chat session
- An RCS messaging user may create group chats involving any combination of RCS-only users, OTT-only users and users who have accounts in both messaging systems.
- OTT users need not download or install special client software to join the RCS chat session.
- The OTT user may join the RCS chat system using any device that provides a standard web browser (virtually all personal computers, smartphones and tablets).

BRIEF DESCRIPTION OF DRAWINGS

In FIG. 1 the server equipment on the local chat service A (such as the wireless carrier's chat system) sends an invitation to the external chat service (such as an OTT chat system) on behalf of the inviting user in the local chat service.

FIG. 2 employs a user device operating in the local chat service to send an invitation directly to the external chat service (OTT chat system) without passing through the local chat server.

GLOSSARY

3GPP Third Generation Partnership Project
API Application Programming Interface
CLIENT a piece of computer hardware and/or software that accesses a service made available by a server.
HTTP Hypertext Transfer Protocol
OTT Over the Top Messaging Service that sends instant messages, video and audio by means of the Internet or other Internet Protocol based transmission path provided by a person or entity other than the OTT (such as messages sent by a third party service using the transmission path provided by the Internet and the Mobile Network operator).
RCS Rich Communications Suite as defined by 3GPP telecommunications specifications. This is also known as Joyn®.
SERVER A messaging server offering instant message, video and other services.
URI Uniform Resource Identifier
XMPP Extensible Messaging and Presence Protocol. XMPP is a communications protocol for message-oriented middleware based on XML.
XML Extensible Markup Language

DETAILED DESCRIPTION

The method of invitation to chat comprises:
i) User-A2 logging into chat service A via Chat Server A;
ii) User-A2 participating in a group chat session with one or more other users using only chat service A;
iii) User-A2 logging into chat service B via Chat Server B;
iv) User-A2 requesting a Uniform Resource Identifier (URI) from the chat server A which identifies the preexisting group chat session;
v) User-B1 available to chat;
vi) User A2 sending the URI to User-B1 via Chat Server B;
vii) User-B1 clicking on the hyperlink associated with the URI;
viii) Optional launching of a webbrowser on User-B1;
ix) User-B1 using asynchronous HTTP requests and HTTP responses to communicate with Chat Server A;
x) Chat Server A receiving the HTTP requests from User-B1 and communicating with User-A2 and other members of the preexisting group chat via the protocol of chat service A.

Figure 1:
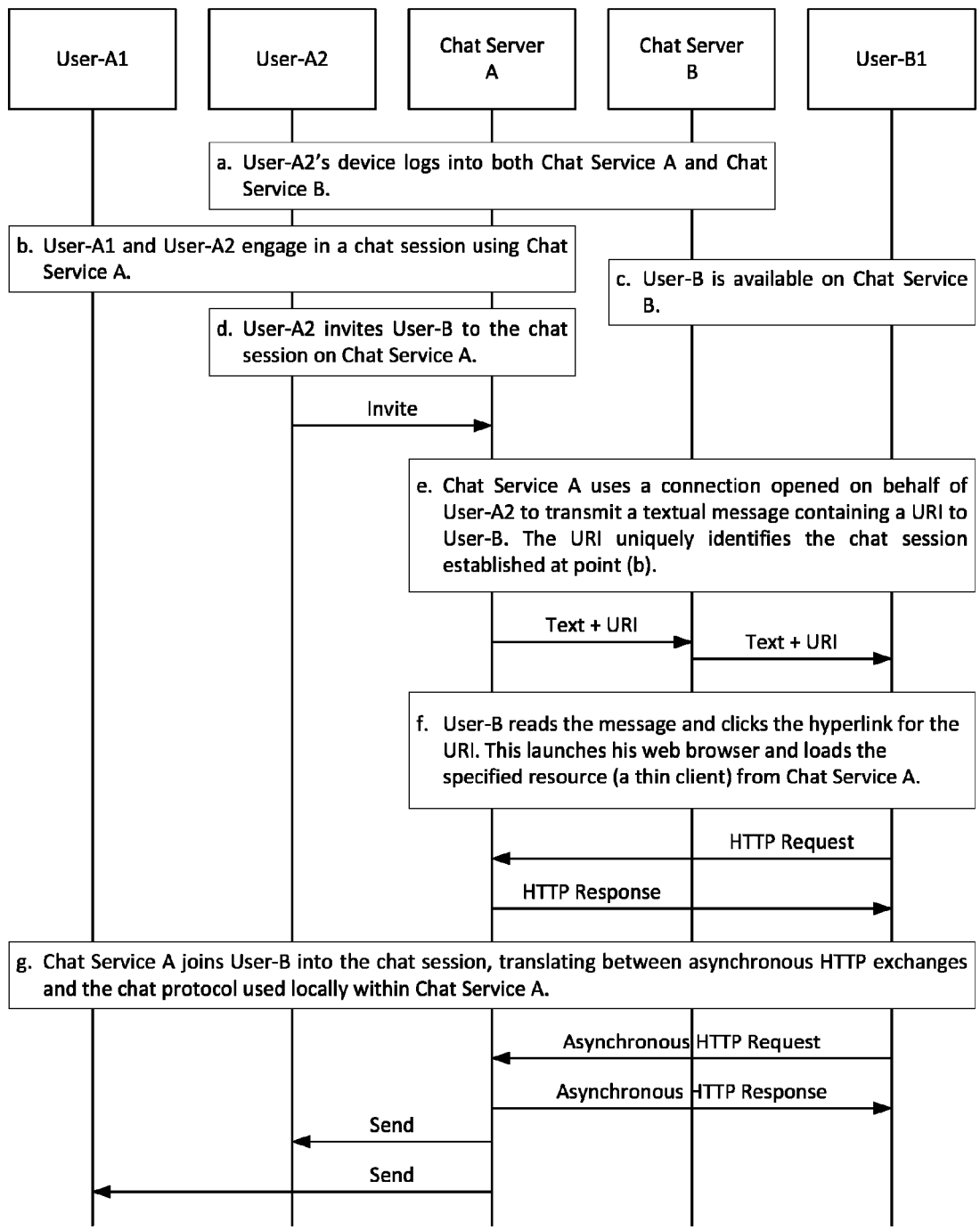
FIG. 1 and FIG. 2 show Chat Service A as the local chat system using Server A and Chat Service B is the external chat system using Server B. User-A1 and User-A2 operate within Chat Service A while Client B1 operates initially within Chat Service B.
Figure 2:
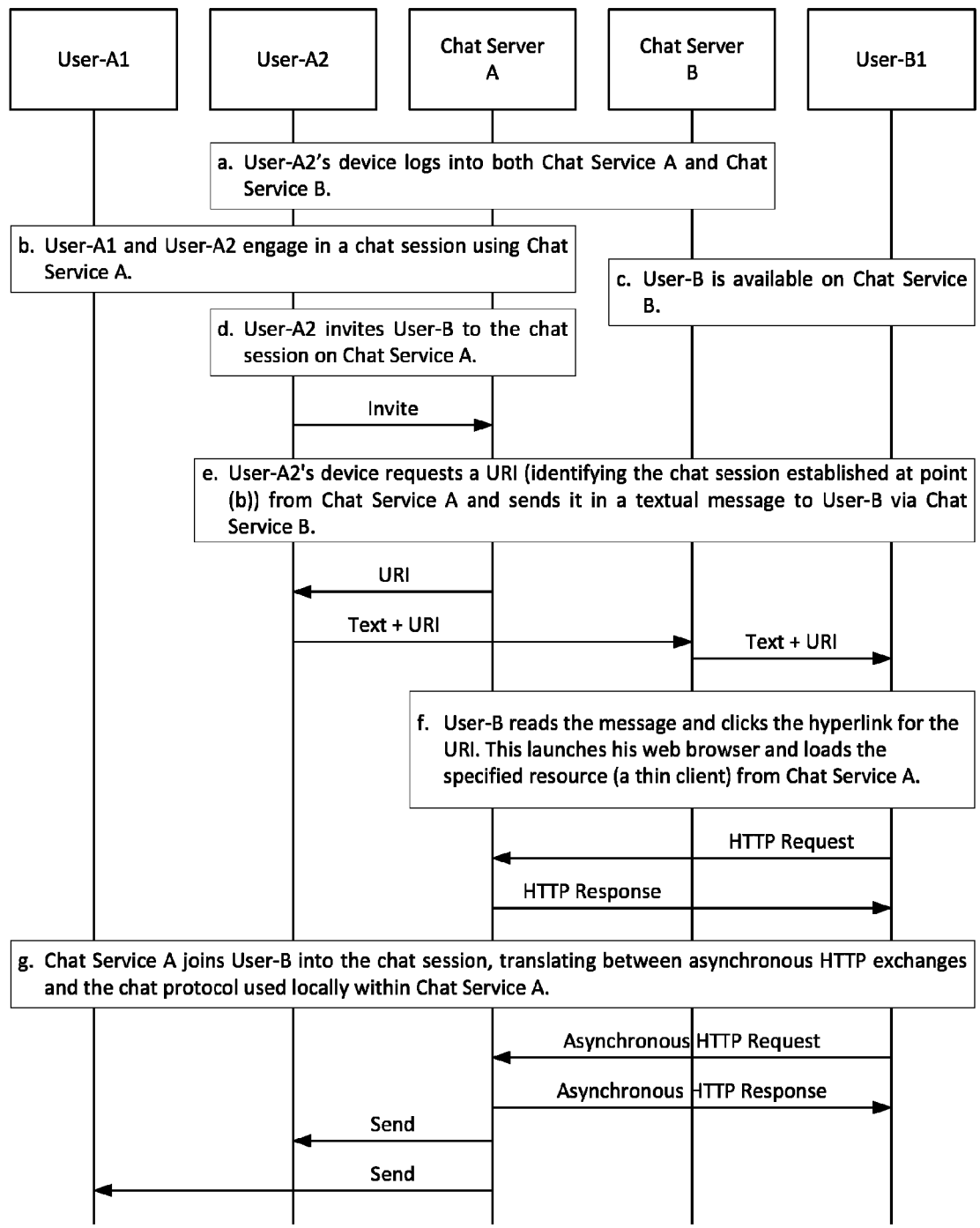
Figure 3:
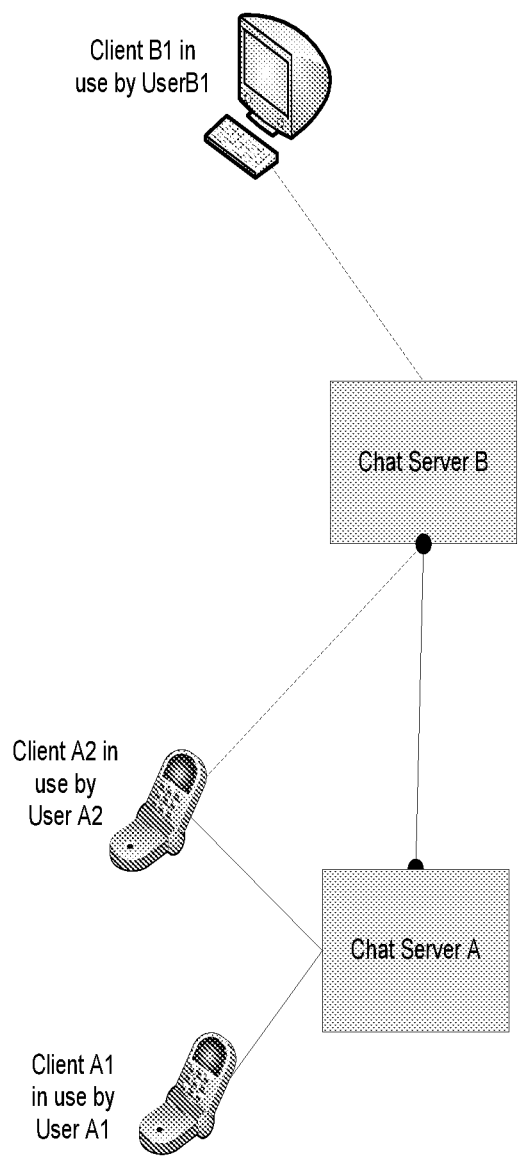
FIG. 3 shows a network diagram with wireless phone clients, User A1 and User A2 in a chat session on Server A. Another client, Client B1, becomes available on a different chat service using Server B. In this figure Client B1 is a desktop computer messaging client though it may also include mobile devices on the alternate chat service. User A2 is connected to Server B. Either User A2, or Server A can issue an invitation, containing a URI to Client B1 via Server B.

Those with ordinary skill in the art will realize that steps iii and step v can occur in earlier parts of the process. Also, step vi can be modified to have the URI sent directly from Chat server A instead of via a client on server A. In addition, those with ordinary skill in the art will recognize that FIG. 3 is a simplified diagram omitting some network elements such as SGSN, GGSN, Internet Protocol routers, media gateways and other devices.

In order to support this method, a messaging client device capable of participating in a group chat on a first chat service is modified to transmit a Uniform Resource Identifier to a different chat service. The messaging client is additionally modified to allow the inviting user to add a custom message (including but not limited to a text, voice file or custom video to the URI (e.g. "Mike—Please join Jim and I discussing the proposal now.") The customization message is often required by terms of service of some OTT providers which prohibit computer generated invitations to chat. Alternately the URI may be sent directly from the messaging server associated with the inviting client with the target recipient and the text supplied by the inviting client.

It is necessary for the messaging server associated with the inviting client to be modified to generate an URI associated with a group message session and also modified to accept asynchronous HTTP requests from the invited user. It is further necessary for the server to be modified to translate the HTTP requests into the protocol used by the particular ongoing group chat.

We claim:
1. A method to invite a messaging client from an external messaging service to a preexisting group chat session in a different service comprising:
  I. A first messaging client logging into a first chat service via a first Chat server, Chat Server A;
  II. The first messaging client participating in a group chat session with one or more other users using a single chat server, Chat Server A;
  III. The first messaging client also logging into a second chat service via a second chat server, Chat Server B;
  IV. The first messaging client requesting a Uniform Resource Identifier (URI) from its chat server A which identifies the preexisting group chat session;
  V. A second messaging client on a second chat service using Chat Server B becoming available to chat;
  VI. Sending the URI from either the first messaging client or the first messaging server associated with the first client, to the second messaging client via the server associated with the second messaging client, Chat Server B;
  VII. A user associated with the second messaging client clicking on the hyperlink associated with the URI;
  VIII. Second messaging client using asynchronous HTTP requests and HTTP responses to communicate with the first chat server associated with first messaging client;
  IX. First Chat Server A, receiving the HTTP requests from second messaging client;
  X. First Chat Server A communicating messages from second messaging client to first messaging client and all other members of the preexisting group chat including members of the preexisting group chat that may not be members of the second chat service.

* * * * *